（12）United States Patent
Madampath (10) Patent No.: US 8,719,849 B1
(45) Date of Patent: May 6, 2014

(54) DECOUPLED APPLICATION PROGRAM-OPERATING SYSTEM COMPUTING ARCHITECTURE

(71) Applicant: Netapp, Inc., Sunnyvale, CA (US)

(72) Inventor: Rajiv Madampath, Bangalore (IN)

(73) Assignee: Nettapp, Inc., Sunnyvale, CA (US)

( * ) Notice: Subject to any disclaimer, the term of this patent is extended or adjusted under 35 U.S.C. 154(b) by 0 days.

(21) Appl. No.: 14/132,205

(22) Filed: Dec. 18, 2013

Related U.S. Application Data (62) Division of application No. 13/079,826, filed on Apr. 5, 2011, now Pat. No. 8,621,496.

(51) Int. Cl.
*G06F 13/00* (2006.01)

(52) U.S. Cl.
USPC .............................................. 719/330; 718/1

(58) Field of Classification Search
CPC . G06F 9/45554; G06F 9/45558; G06F 9/547; G06F 9/548; G06F 2009/4557
See application file for complete search history.

(56) References Cited

U.S. PATENT DOCUMENTS

| 8,091,097 | B2 | 1/2012 | Chen et al. |
| 2003/0023839 | A1 | 1/2003 | Burkhardt et al. |
| 2003/0115379 | A1* | 6/2003 | Burton et al. ................. 709/330 |
| 2005/0050548 | A1 | 3/2005 | Sheinis et al. |
| 2007/0027878 | A1* | 2/2007 | Droshev et al. ................. 707/10 |
| 2007/0168509 | A1 | 7/2007 | Droshev et al. |
| 2008/0086729 | A1 | 4/2008 | Kondoh et al. |
| 2011/0239216 | A1* | 9/2011 | Miyajima ......................... 718/1 |
| 2012/0096527 | A1* | 4/2012 | Pasternak .......................... 726/7 |

* cited by examiner

*Primary Examiner* — Andy Ho
(74) *Attorney, Agent, or Firm* — Klein, O'Neill & Singh, LLP (57) ABSTRACT

A method of application program-operating system decoupling includes performing, through an application program configured to execute on a client machine, a system call to a first operating system executing on a server machine over an interconnect configured to couple the server machine to the client machine. The method also includes serving the application program configured to execute on the client machine through the first operating system executing on the server machine in accordance with the system call.

21 Claims, 7 Drawing Sheets

DECOUPLED APPLICATION PROGRAM-OPERATING SYSTEM COMPUTING ARCHITECTURE

FIELD OF TECHNOLOGY

This disclosure relates generally to computing system(s) and, more particularly, to a method, an apparatus, and/or a system of a decoupled application program-operating system computing architecture.

BACKGROUND

Reliability of an application program executing on a computing device is dependent on the reliability of the underlying operating system, in addition to the robustness thereof. When critical application programs are hosted on server machines that are highly utilized, the probability of server crashes may increase due to the increased load associated with the application programs. Clients executing the application programs may experience large outage times and/or incorrect execution associated therewith.

In a traditional computing model, the operating system, device drivers and the application program(s) occupy tiers of a hierarchy, in accordance with which the operating system and the device drivers are at a "low level," in contrast to the application program(s) at a "high level." Application programs may communicate to the operating system through system calls, and the operating system keeps the application programs apprised of events through signals. Although application program(s) execute in disjoint address spaces and, therefore, are insulated from external application program failures, the failure(s) associated with the operating system may affect the entire computing system.

Reliability solutions such as check pointing may enable the restart of application program(s) in the event of an operating system crash. Check pointing may involve writing the state information of a computing system to persistent storage from time to time. Following an operating system crash and a subsequent reboot of the computing system, an application program executing thereon may be restored to a previous state thereof prior to the crash. However, the change in state information from the previous checkpoint may be lost. Other solutions such as high availability clusters try to reduce downtime by maintaining partner node(s) that take over services associated with a primary node following a crash. The aforementioned solutions have limitations such as performance in the case of check pointing and homogenous hardware configuration requirement(s) in the case of clustering.

SUMMARY

Disclosed are a method, an apparatus, and/or a system of a decoupled application program-operating system computing architecture.

In one aspect, a method of application program-operating system decoupling includes performing, through an application program configured to execute on a client machine, a system call to a first operating system executing on a server machine over an interconnect configured to couple the server machine to the client machine. The method also includes serving the application program configured to execute on the client machine through the first operating system executing on the server machine in accordance with the system call.

In another aspect, a method of requesting service from a first operating system executing on a server machine through an application program configured to execute on a client machine includes marking a shell on the client machine or the application program configured to execute thereon with a loader flag through a second operating system executing on the client machine. The method also includes performing, through the client machine, a system call to the first operating system executing on the server machine instead of the second operating system based on the marking of the shell or the application program.

In yet another aspect, a decoupled application program-operating system computing architecture includes a server machine executing a first operating system thereon, a client machine executing a second operating system thereon and an interconnect configured to couple the server machine to the client machine. An application program configured to execute on the client machine is configured to perform a system call to the first operating system executing on the server machine over the interconnect. The first operating system is configured to serve the application program configured to execute on the client machine in accordance with the system call.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to realize a decoupled application program-operating system computing architecture. Although the present embodiments have been described with reference to specific example embodiments, it will be evident that various modifications and changes may be made to these embodiments without departing from the broader spirit and scope of the various embodiments.

Figure 1:
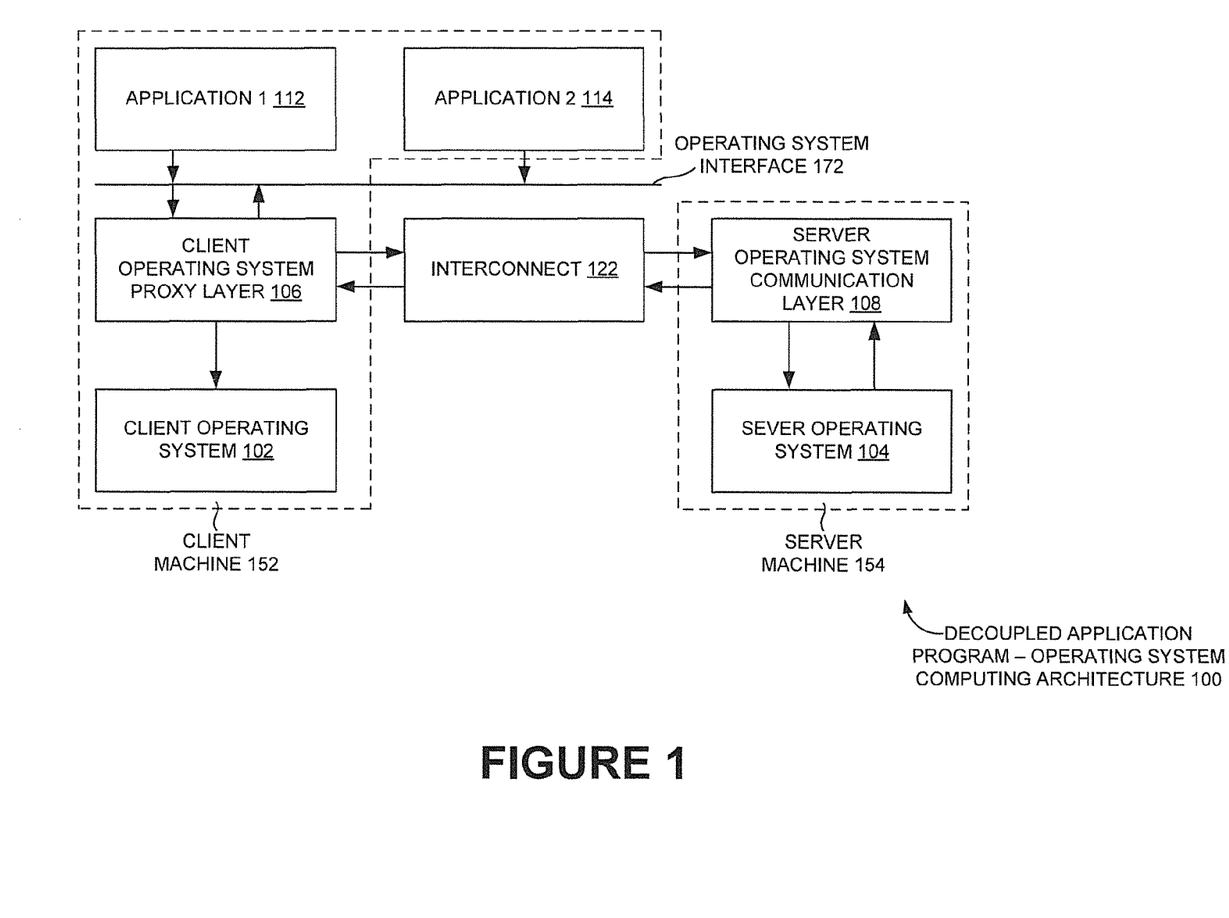
FIG. 1 is a schematic view of a decoupled application-operating system computing architecture, according to one or more embodiments.

FIG. 1 shows a decoupled application-operating system computing architecture 100, according to one or more embodiments. In one or more embodiments, in accordance with decoupled application-operating system computing architecture 100, one or more application programs (e.g., application 112 and application 114) may be configured to execute on a client machine (e.g., client machine 152) coupled to a server machine (e.g., server machine 154) configured to execute the operating system associated therewith. In one or more embodiments, the word "machine" as used herein may refer to a standalone computing device configured to execute an operating system or a virtual machine (VM) running an instance of an operating system. Thus, as shown in FIG. 1, the operating system associated with the client machine may be client operating system 102 and the operating system associated with the server machine may be server operating system 104.

In one example embodiment, two instances of an operating system may be running on two VMs on the same physical hardware as client operating system 102 and server operating system 104. Here, client operating system 102 may communicate with server operating system 104 over a dedicated fast interconnect (e.g., interconnect 122). "Interconnect" (e.g., interconnect 122), as used herein, may refer to a means for coupling client operating system 102 and server operating system 104. In one or more embodiments, interconnect 122 may be associated with wired coupling or wireless coupling (e.g., a wireless computer network). In another example embodiment, the client machine may be a workstation with one or more disks (not shown; e.g., hard disks), which is configured to boot a local operating system thereof over a computer network (an example of interconnect 122) using a bootstrap protocol. In one or more embodiments, as VMs may share the same underlying physical hardware (e.g., processor), client operating system 102 and server operating system 104, distinct from one another, may be executing on two VMs on the same underlying physical hardware. Here, in one or more embodiments, interconnect 122 may refer to a hardware "connection" between the two VMs. In one or more embodiments, dedicated hardware may also be utilized for both client operating system 102 and server operating system 104, with the physical hardware being coupled through the fast interconnect.

The speed of interconnects (e.g., Gigabit Ethernet™ (GbE)) may match processor bus speeds, thereby rendering the use of interconnects viable. In some cases, the interconnects (e.g., Memory Channel™) may perform better than GbE. Thus, in one or more embodiments, performance may not be affected through the coupling of the client machine to the server machine over the fast interconnect. In one or more embodiments, there may not be a performance penalty associated with an application program (e.g., application 112) performing system call(s) to server operating system 104 over the interconnect. A system call may be a means for the application program to request for service from the operating system (or, the kernel of the operating system).

In one or more embodiments, in the client-server model of FIG. 1, the one or more application program(s) may serve as "client(s)" and the "operating system" may become a "server." Thus, in one or more embodiments, the application program(s) and the operating system may execute on different machines, as discussed above. Here, in one or more embodiments, client operating system 102 may act as a "proxy" for server operating system 104, analogous to an Remote Procedure Call (RPC) model where application programs primarily execute on one machine and occasionally perform RPC calls to an operating system (or, application program(s)) executing on another machine. In one or more embodiments, the one or more application program(s) may always perform the analogous RPC call(s) during system calls. FIG. 1 shows a demarcation between the application program-level (or, user level) and the operating system-level as operating system interface 172.

In one or more embodiments, to aid the restart of the one or more application program(s) after a failure of server operating system 104, argument(s) associated with system call(s) and return values may be logged at client machine 152 and subsequently replayed upon the failure to reestablish the kernel state associated with the one or more application program(s). In one or more embodiments, the aforementioned logging of the system call argument(s) and the return values may invalidate the necessity for writing large amounts of state information to non-volatile storage (e.g., disk). In one or more embodiments, this is in contrast to the performance-taxing checkpointing (or, application check pointing), which involves writing the state information of the system to persistent storage from time to time. During checkpointing, state information may be written to disk and/or a Non-Volatile Random-Access Memory (NVRAM) associated with the computing system. In the case of the state information being written to disk, it is obvious that the content(s) of NVRAM have to be written to disk following a threshold usage of the NVRAM being exceeded.

In one or more embodiments, the probability of client operating system 102 crashing in the window of time that server operating system 104 reboots may be low as client operating system 102 does not perform the bulk of the processing. In one or more embodiments, client operating system 102 may be more reliable than server operating system 104, which may service several application requests at the same time. In check pointing, the change in state information from the previous checkpoint may be lost. In the exemplary embodiments discussed herein (e.g., with reference to FIG. 1), the one or more application program(s) may restart at a system call granularity. In other words, in one or more embodiments, if an application program is not in a system call at the time the server machine crashed, the application program may reach the next system call point and hang there until the server machine restarts and services the system call. Thus, in one or more embodiments, no state information may be lost. In one or more embodiments, the client machine may monitor the server machine (e.g., through a heartbeat mechanism) to know when the server machine crashes and reboots in order to retry a system call.

In one or more embodiments, if the client machine determines that the server machine is unreachable through the heartbeat mechanism (e.g., meaning that the connectivity thereto is lost), the client machine may choose to connect to a different server machine and replay the system call log to reestablish the kernel state. In one or more embodiments, thereby, through the decoupling of the application program and the operating system, the client application program may not be tied to a particular server machine.

A "process" may be an instance of a computer program being executed. A "process" may be instantiated on, for example, a UNIX system via a call to fork( ) followed by a call to exec( ) which performs a major portion of the work associated therewith. In a multithreading environment, the function fork( ) may enable duplication of a thread of execution, thereby creating a child process from a parent process. In other words, fork( ) may create a separate address space for the child process. The function exec( ) may be utilized to enable the new process associated with the child to run a new program. The function exec( ) sets up the virtual address space of the new program by initializing the page tables. A page table may be a data structure utilized by a virtual memory system in an operating system to store the mapping between virtual addresses and physical addresses. Virtual addresses may be unique to a "process."

Following the initialization of the page tables, the operating system may schedule the "process" to run on a central processor (e.g., Central Processing Unit (CPU)). The "process" may compete with other processes to execute on the central processor. The "process" may be in an "executable" state while in the "execute" queue, and may transition to the "executing" state when scheduled. After the time quantum associated therewith expires, the "process" may transition back to the "executable" state and be placed back in the "execute" queue. If the "process" is blocked for synchronization, the "process" may be added to a "sleep" queue, and may be in a "blocked" state. The operating system may then schedule another "process" to execute on the central processor.

While the "process" is executing, the "process" may request for services from the operating system by performing system calls. When the service request occurs, the central processor may switch from a user mode (or, application program mode) to a kernel mode (or, operating system mode), and may continue execution inside the kernel. Inside the kernel, the "process" may proceed to a "blocked" state when Input/Output (I/O) is performed or when blocking for specific resources (e.g., synchronization variables) to become available occurs. Once the condition associated with the blocking clears, the "process" may continue execution, and may eventually transition back to the user mode when in the system call return path. From then on, the "process" may continue execution until a time slice thereof expires. When the "process" completes the task(s) associated therewith, the "process" may exit, and the operating system may clean up the address space associated therewith.

The operating system may also asynchronously notify the "process" of events through signals. Signal handlers may be called by the "process" to handle signals, which may also be sent to terminate the "process" and/or initiate a cleanup operation associated therewith.

As will be discussed below, in one or more embodiments, once the assumption of the one or more application program(s) executing on the same machine as the operating system is dispensed with, changes may need to be made in the implementation of the operating system, whose functionalities have been discussed above. However, in one or more embodiments, most of the aforementioned changes may be in the interface (e.g., at operating system interface 172) between user-space processes and the operating system, thereby enabling the retention of a lot of elements (e.g., with minor alteration) existing in the implementations of the operating system discussed above.

In one or more embodiments, as shown in FIG. 1, at the client side, a client operating system proxy layer 106 configured to route requests to server operating system 104 and to interpret responses there from may be implemented. In one or more embodiments, as communication may occur between the kernels of client operating system 102 and server operating system 104, a communication protocol for handling various transactions there between may be defined. In one or more embodiments, the aforementioned transactions may be handled through client operating system proxy layer 106 and a server operating system communication layer 108 as shown in FIG. 1. Again, in one or more embodiments, server operating system communication layer 108 may serve to interpret requests from client operating system proxy layer 106.

In an example implementation, data communication endpoints (e.g., sockets) maybe used on both the client side and the server side to "listen" to messages from the corresponding server side and the client side. Another example implementation may include implementation at a higher level through RPC(s). It is obvious that other example implementations are within the scope of the exemplary embodiments.

Modification(s) that may need to be made to the kernel subsystem of each of client operating system 102 and server operating system 104 will be discussed below, along with relevant communication protocol operation(s). A socket model may be assumed, wherein, for example, Transmission Control Protocol (TCP) sockets may be utilized to enable retransmission and retry in the case of server operating system 104 going down. The socket model may be mapped to an RPC model. In one or more embodiments, as client operating system 102 may not be loaded with application program(s), client operating system 102 may be reliable.

In one or more embodiments, a special shell may be created on the client machine such that the one or more application program(s) configured to execute thereon may utilize server operating system 104 instead of client operating system 102. However, in one or more embodiments, the special shell may exercise only client operating system 102, and only application programs started from the special shell may utilize server operating system 104 for system call servicing. For the aforementioned behavior of the shell, in one or more embodiments, the shell may be marked executable using special loader flag(s).

The term "shell" used above may indicate software that provides a user interface to an operating system that provides access to the services associated with the kernel.

In one or more embodiments where the operating system is analogous to UNIX, upon the loading of the shell, the vnode associated with the shell executable may be marked with the special loader flag. In one or more embodiments, the aforementioned special loader flag may be copied to a child process through a fork( ) system call, which may cause client operating system 102 to execute fault-tolerant code paths involving interaction with the kernel associated with server operating system 104 early on in any system call. In one or more embodiments, client operating system proxy layer 106 may perform the aforementioned function by intercepting system call(s) early.

"vnode" discussed above may refer to the virtual file system layer associated with the kernel. The virtual file system layer may be an abstraction layer on top of a file system implementing the operating system associated with the kernel. The virtual file system layer may be utilized to enable access of the file system through a client application program.

In one or more embodiments, client operating system proxy layer 106 may be configured to detect that the operating system serving the application program(s) is not the underlying client operating system 102 but is server operating system 104. It is known to one skilled in the art that whenever an application program starts from a shell, the application program inherits the attributes thereof. As discussed above, in one or more embodiments, the shell may be specially marked with a loader flag indicating that the application programs that execute on top thereof are always served from server operating system 104. In accordance with the aforementioned process, in one or more embodiments, client operating system proxy layer 106 may always intercept the system call from the application program. In one or more embodiments, whenever client operating system proxy layer 106 notes that the application program is started from the special shell, the loader flag may be set through client operating system 102.

In one or more embodiments, as discussed above, the application program may also inherit the attributes from the shell. Thus, in one or more embodiments, any application program that starts on client machine 152 on any shell (e.g., an ordinary shell) other than the special shell may necessarily utilize only client operating system 102. Therefore, in one alternate embodiment, once the application program is compiled and the executable built, client operating system 102 may utilize another tool to specially mark the header associated with the application program executable with the loader flag. In one or more embodiments, the aforementioned technique may substitute marking the shell with the loader flag. However, marking the shell with the loader flag may be preferable to marking each and every application program with a loader flag.

The lifecycle of an application program (e.g., application 112) performing file I/O, as interpreted through decoupled operating system-application computing architecture 100 shown in FIG. 1 will be discussed below.

In one or more embodiments, when an application program opens a file, the file system layer on client operating system 102 may attempt to open the file through querying server operating system 104 to obtain a file descriptor therefor. In one or more embodiments, the file system layer on client operating system 102 may package the open system call arguments into a network message and may transmit a request associated with opening the file to server operating system 104 through interconnect 122. In an example implementation, the aforementioned request may take the form:

CLIENT_FOPEN_REQ<args>, where args refers to the arguments associated with the request.

In one or more embodiments, the server machine may open the file and return the file descriptor to the client machine in an acknowledgement message. In one or more embodiments, when the application program performs a system call associated with a read( ) function or a write( ) function using the same file descriptor, client operating system 102 may be aware of the need to forward the request to server operating system 104 due to the special loader flag present in the vnode of the application program executable. In one or more embodiments, client operating system 102 may transmit a read request message to server operating system 104. In an example implementation, the read request may take the form:

CLIENT_READ_REQ<args>, where args, again, refers to the arguments associated with the request.

In one or more embodiments, the server machine may read a number of bytes from the file, in accordance with the read request, and may transmit the requested data in a reply to the client machine. In one or more embodiments, client operating system 102 may then copy the contents associated with the number of bytes to a buffer on the client machine, and may return back to the application program.

In one or more embodiments, in accordance with a write( ) system call, client operating system 102 may transmit a write request to server operating system 104 that contains the data to be written. In an example implementation, the write request may take the form:

CLIENT_WRITE_REQ<args>, where args refers to the arguments associated with the write request.

In one or more embodiments, server operating system 104 may copy the data to be written to a buffer at the server machine, and may transmit an acknowledgment to client operating system 102. In one or more embodiments, client operating system 102 may then unblock the "process" to resume execution. In one or more embodiments, the aforementioned file open, read and write accesses may be summarized as data accesses through the application program, and the file descriptor as merely a descriptor for generalization purposes.

In one or more embodiments, following the successful writing of "dirty" buffer (or, buffer cache) pages to non-volatile storage (e.g., disk) on server operating system 104, server operating system 104 may indicate the aforementioned success to client operating system 102 through a message. In one or more embodiments, client operating system 102 may then retain the "dirty" buffer pages in a memory thereof till the time the message is received. In one or more embodiments, if server operating system 104 crashes and reboots, the "dirty" buffer pages pending on client operating system 102 may be transmitted once again over interconnect 122 to be written to non-volatile storage (e.g., disk) on the server machine. In one or more embodiments, thus, consistency of the file system may be maintained in case of a crash of server operating system 104.

The phrase "dirty" buffer pages may be associated with new data that is not yet flushed to non-volatile storage (e.g., disk). It is obvious that the flushing to non-volatile storage (e.g., disk) may be done periodically in a computing system.

Figure 2:
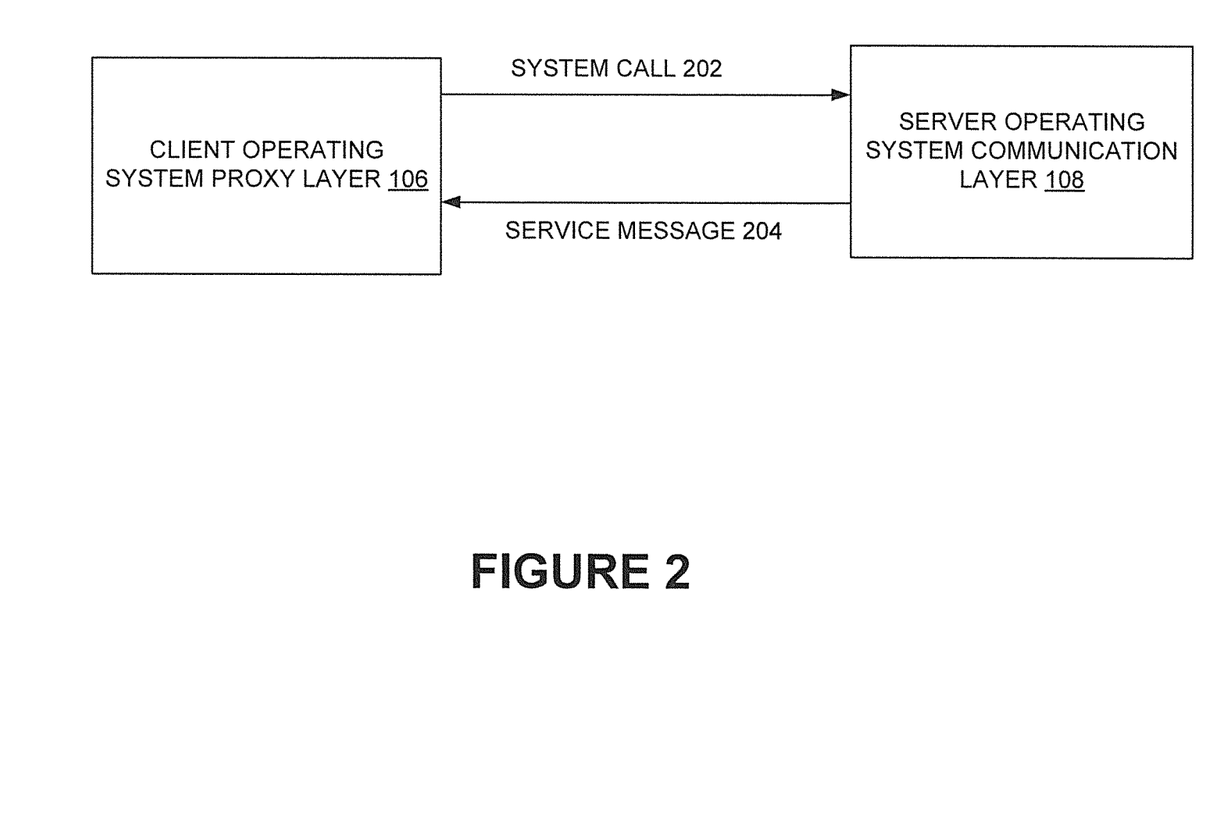
FIG. 2 is a schematic view of servicing a system call transmitted from the client operating system proxy layer through the server operating system communication layer of FIG. 1, according to one or more embodiments.

FIG. 2 clearly shows service request 202 transmitted from client operating system proxy layer 106 being serviced (e.g., through service message 204) by server operating system 104 through server operating system communication layer 108.

Figure 3:
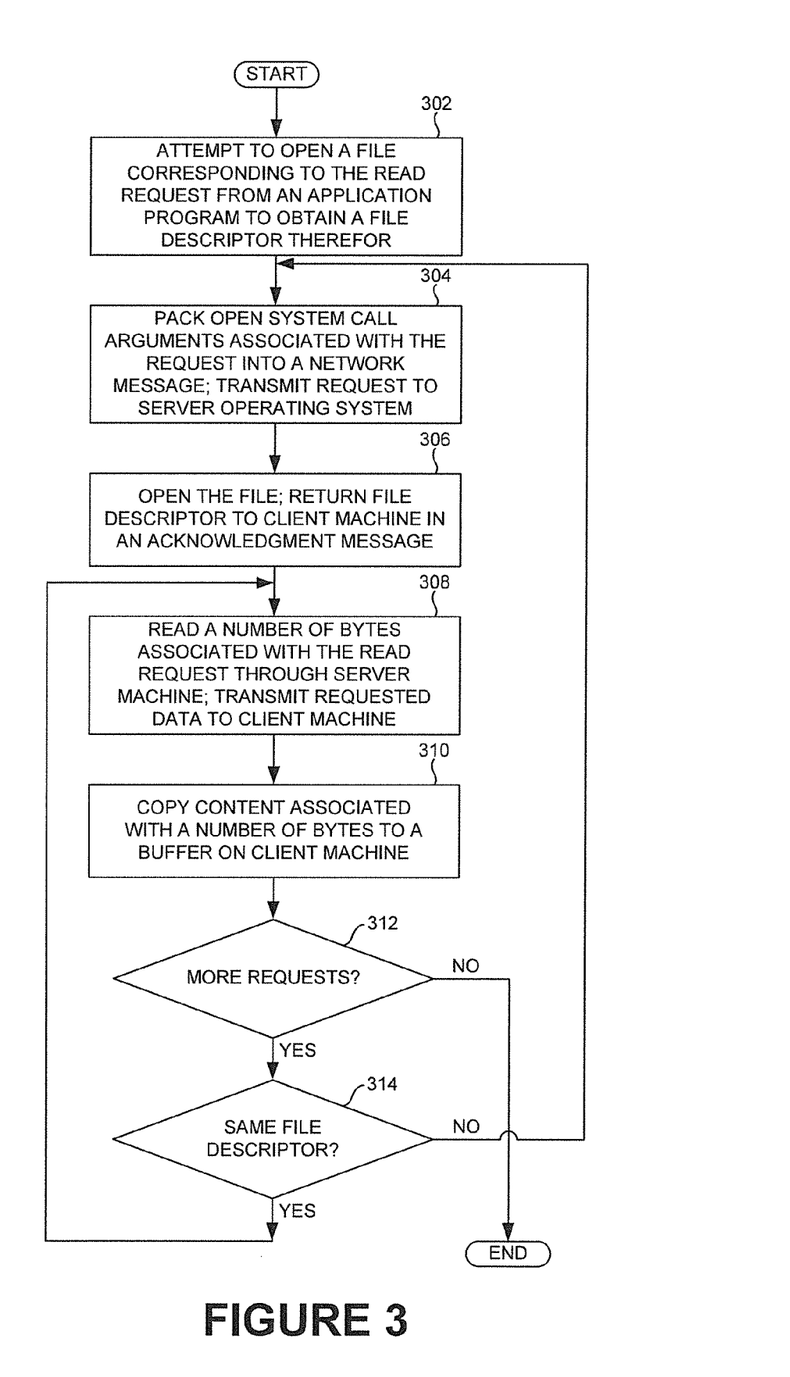
FIG. 3 is a flowchart detailing the operations involved in the processing of read request(s) through the server operating system of FIG. 1, according to one or more embodiments.

FIG. 3 shows a flowchart summarizing the operations involved in the abovementioned example processing of read request(s) through server operating system 104, according to one or more embodiments. In one or more embodiments, operation 302 may involve the file system layer on client operating system 102 attempting to open a file corresponding to the open request from an application program (e.g., application 112) on the client machine to obtain a file descriptor therefor. In one or more embodiments, operation 304 may then involve the file system layer on client operating system 102 packing the open system call argument(s) associated with the request into a network (e.g., computer network associated with communication between client operating system 102 and server operating system 104) message, and transmitting the request associated with opening the file to server operating system 104 through interconnect 122.

In one or more embodiments, operation 306 may then involve the server machine opening the file and returning the file descriptor to the client machine in an acknowledgment message. In one or more embodiments, operation 308 may involve reading a number of bytes associated with the read request through the server machine and transmitting the requested data to the client machine. In one or more embodiments, operation 310 may then involve client operating system 102 copying the contents associated with the number of bytes to a buffer on the client machine.

In one or more embodiments, operation 312 may involve checking for more requests. In one or more embodiments, if yes, operation 314 may involve checking through client operating system 102 as to whether a subsequent system call associated with the subsequent read request from an application program uses the same file descriptor obtained above. In one or more embodiments, if yes, control may be transferred to operation 308. If no, in one or more embodiments, control may be transferred to operation 304. In one or more embodiments, if there are no subsequent requests, the process may terminate. Thus, in one or more embodiments, when the application program performs a system call associated with a read( ) function (or, even a write( ) function) using the same file descriptor, client operating system 102 may be aware of the need to forward the request to server operating system 104, as discussed above.

To summarize, in one or more embodiments, whenever an application program associated with client machine 152 issues an open system call, client operating system proxy layer 106 may be configured to intercept the system call and package a network request with arguments (e.g., file name, read-only flag) to be transmitted over interconnect 122 to server machine 154. In one or more embodiments, server operating system communication layer 108 may be configured to unpack the network request and reconstruct the original open call (i.e., reverse engineer).

In one or more embodiments, in decoupled application-operating system computer architecture 100 proposed herein, the application program-level (or, user level) state information and the operating system level state information may be split. In one or more embodiments, application program-level page tables (e.g., for pages that an application program accesses in a user-mode) associated with client operating system 102 may be maintained at the client machine and operating system-level page tables (e.g., for pages accessed in a kernel mode), along with a copy of the application-level program tables, may be maintained at the server machine. In other words, in one or more embodiments, a page table for pages associated with the application program may be maintained at the client machine and complete address space data structures for the application program executing on the client machine may be maintained at the server machine. Complete address space data structures include the page table.

In traditional architectures where the application programs and the operating system are resident on the same machine, the entire address space of a "process," including the page(s) referenced by the application program and the page(s) referenced by the operating system, resides on the same machine. Thus, application program accesses to pages that lie in the kernel address space may be "trapped," leading to the termination of the application program when the privilege level is not set to a kernel-level.

Figure 4:
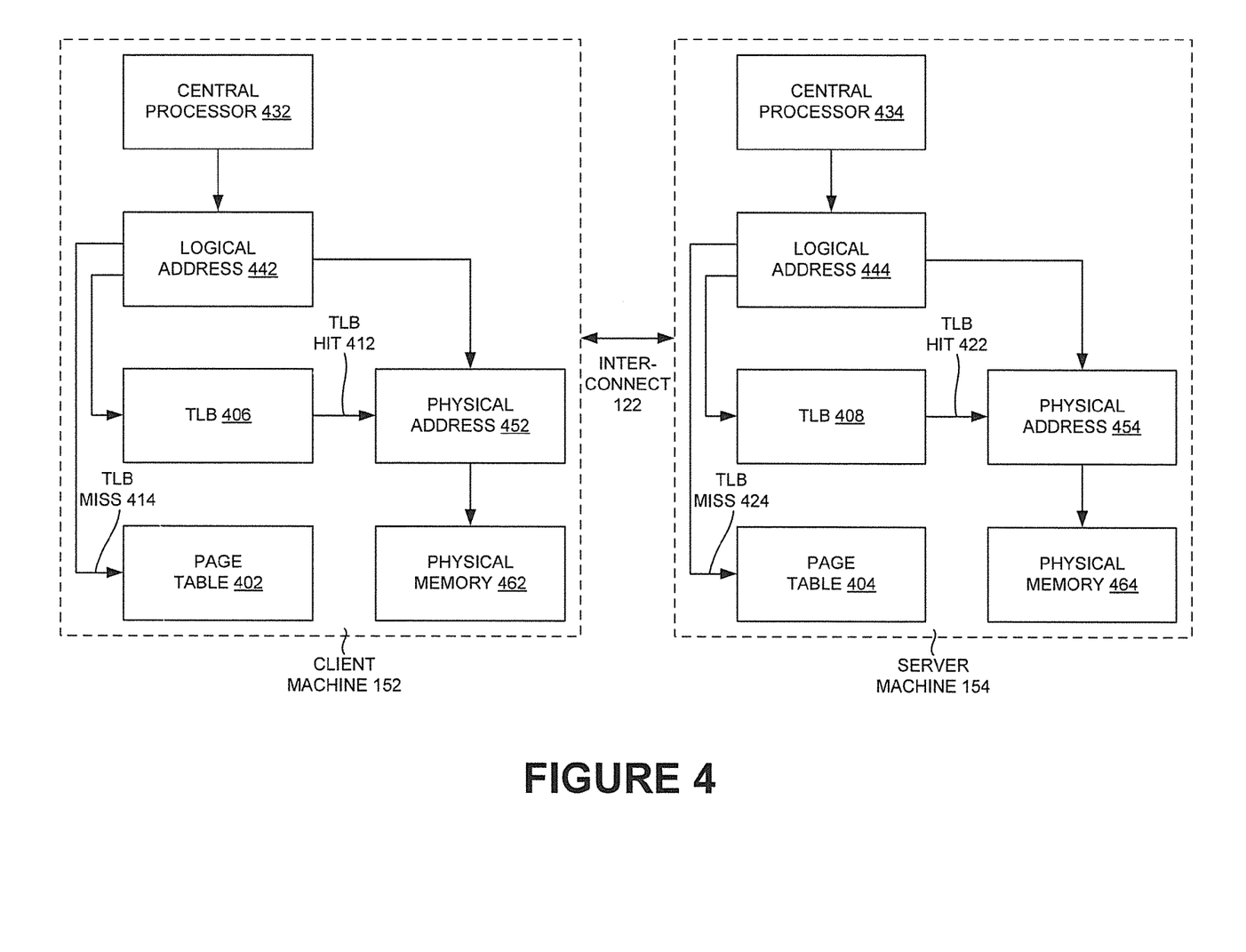
FIG. 4 is a schematic view of the virtual memory implementation associated with the decoupled computing architecture of FIG. 1, according to one or more embodiments.

In the traditional architecture discussed above, the virtual memory space may be divided into two parts: one associated with the kernel of the operating system and the other for the application programs (i.e., at the user level). A Translation Look-aside Buffer (TLB) may be utilized to cache and hold page table entries. FIG. 4 shows the virtual memory implementation associated with the decoupled architecture of FIG. 1, according to one or more embodiments. Specifically, FIG. 4 shows address translation mechanisms at both the client machine (e.g., client machine 152) and the server machine (e.g., server machine 154), according to one or more embodiments.

In one or more embodiments, as discussed above, application program-level page tables may be maintained at client machine 152 and operating system-level page tables may be maintained at server machine 154, along with a copy of the application program-level page tables. Although FIG. 3 merely shows page table 402 as being associated with client machine 152 and page table 404 as being associated with server machine 154, it is obvious to infer the association(s) thereof with the abovementioned application program-level page table(s) and the operating system-level page table(s).

In one or more embodiments, TLB 406, at client machine 152, may manage address translation hits (e.g., TLB hit 412) in the same away as in the traditional architecture discussed above. Address translation hit may refer to an event where a requested address is present in the TLB. In one or more embodiments, TLB misses (e.g., TLB miss 414) for the set of instructions associated with the application program may be serviced by the local kernel on the client machine by looking up page table 402 for the mapping TLB miss may refer to an event where the requested address is not present in the TLB. In one or more embodiments, data pages may be serviced over interconnect 122 through sending an appropriate request during a page fault. In an example implementation, the aforementioned request may take the form:

CLIENT_DATA_PAGE_REQ<args>, where args refers to the arguments associated with the request.

Thus, in one or more embodiments, the page fault handler associated with the client-side and the server-side implementation(s) may have to be appropriately modified. In one or more embodiments, server machine 154 may respond to the request by looking up the address space data structures and page tables (e.g., page table 404) maintained thereon. In one or more embodiments, if the page is found, the physical page content(s) may transferred over interconnect 122 to client machine 152. In one or more embodiments, once the data page is transferred to client operating system 102, the page table mapping may be updated and further accesses to the aforementioned page may be resolved from the memory associated with client operating system 102.

In one or more embodiments, if no address translation is found on server operating system 104, the process may be terminated as in the traditional architecture, i.e., through the transmission of an appropriate signal from the kernel of server operating system 104 to the kernel of client operating system 102. In one or more embodiments, the kernel of client operating system 102 may transmit the signal to the process by acting as a "proxy" for the kernel associated with server operating system 104. In one or more embodiments, the kernel associated with client operating system 102 may then clean up address space associated with the appropriate application program and transmits an acknowledgment back to the kernel associated with server operating system 104 to allow for further cleanup on server machine 154.

FIG. 3 also shows central processor 432 of client machine 152 and central processor 434 of server machine 154, in accordance with one or more embodiments. Further, FIG. 3 shows elements such as logical address 442, physical address 452 and physical memory 462 as being associated with client machine 152 and logical address 444, physical address 454, TLB 408, TLB hit 422, TLB miss 424 and physical memory 464 as being associated with server machine 154. As descriptions and functionalities associated with the aforementioned elements within the context of address translation are well known to one skilled in the art, discussion associated therewith has been skipped for the sake of convenience and/or brevity.

In one or more embodiments, in the case of client operating system 102 and server operating system 104 executing on VMs having the same underlying physical hardware (or, having different underlying physical hardware), the central processor(s) (e.g., central processor 432, central processor 434) may be associated with the underlying hardware. However, in one or more embodiments, as the application program uses virtual addressing, mapping between the virtual address and the physical address (e.g., actual physical page on a RAM) may be done. Therefore, in one or more embodiments, if the application program and server operating system 104 are associated with the same physical hardware, server operating system 104 may maintain a page table on behalf of the application program such that when the application program requests for a virtual address, server operating system 104 may look up the page table for the application program to obtain the physical page where the virtual address is found.

In one or more embodiments, in case the physical page is not loaded into memory (e.g., in the RAM), server operating system 104 may initiate a fetch from non-volatile storage (e.g., disk) in order for the physical page to be read. In one or more embodiments, when the read is completed, an interrupt may be sent to server operating system 104. In one or more embodiments, till that time, the application program may be transitioned into a "sleep" state through client operating system 102. In one or more embodiments, when server operating system 104 gets serviced with the particular page request, and the information is transmitted to the client machine, the application program is "woken" up to restart the same instructions associated therewith prior to the "sleep" state.

In one or more embodiments, all application programs executed on the special shell (discussed above) on client operating system 102 may execute over server operating system 104. In one or more embodiments, the initial address space of the application program may be set up through a system call analogous to the fork( ) system call, which duplicates the address space of the shell. Thus, in one or more embodiments, no modification associated with the fork( ) (or, analogous to fork( )) implementation may be required other than what is mentioned in the discussion associated therewith above.

In one or more embodiments, when the program loader attempts to setup the address space during the exec( ) system call (or, an analogous system call), the program loader detects the special loader flag discussed above, and appropriately interprets the need to request server operating system 104 to load the address space thereof. In an example implementation, the aforementioned request takes the form:

CLIENT_EXEC_REQ<args>, where args refers to the arguments associated with the request.

In one or more embodiments, server operating system 104 then initializes the address space data structures and page tables thereof and then returns the virtual address for the symbol main( ) (or, an analogous function signifying beginning of execution of the application program, depending on the implementation) back to client operating system 102. In one or more embodiments, client operating system 102 may then attempt to execute the program by calling the address associated with main( ). In one or more embodiments, as the client page table (e.g., page table 402) is not yet populated, the aforementioned attempt to execute the program may result in a page fault. In one or more embodiments, the page fault handler associated therewith may be aware of the need to query server operating system 104 for a resolution. Thus, in one or more embodiments, the page fault handler associated with client machine 152 may transmit an appropriate request to server operating system 104. In an example implementation, the aforementioned request may take the form:

CLIENT_DATA_PAGE_REQ<args> where args refers to the arguments associated with the request.

In one or more embodiments, the page may now be read in and content(s) thereof may be transmitted over interconnect 122 to client operating system 102, which then allocates a physical page thereto and updates page table 402. In one or more embodiments, every subsequent page fault by the application program may be handled similarly.

Figure 5:
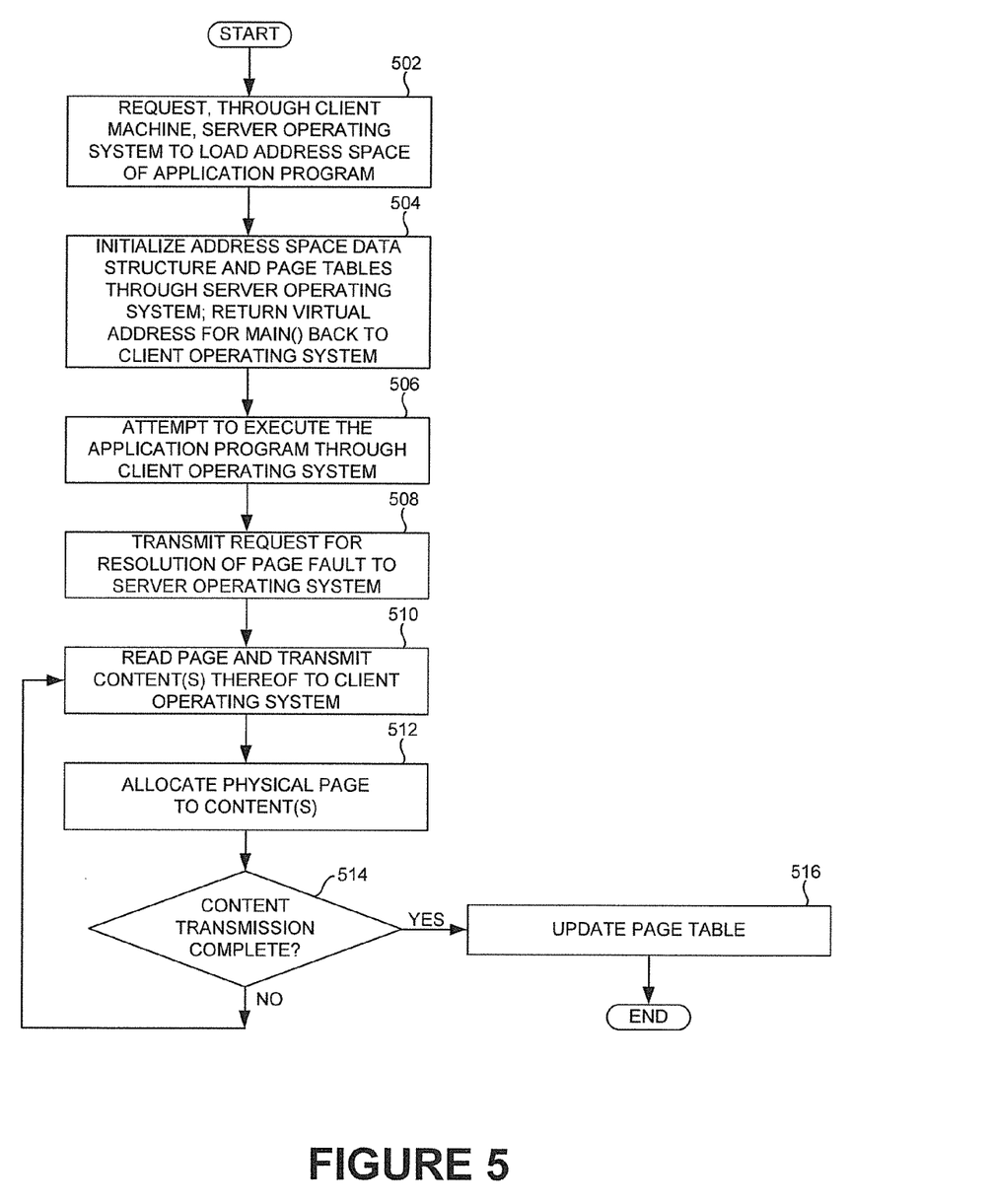
FIG. 5 is a flowchart detailing the operations involved in process creation associated with the decoupled computing architecture of FIG. 1, according to one or more embodiments.

FIG. 5 shows a flowchart summarizing the operations involved in the abovementioned process creation, according to one or more embodiments. In one or more embodiments, operation 502 may involve requesting, through client machine 152, server operating system 104 to load the address space of an application program (e.g., application 112). In one or more embodiments, operation 504 may then involve server operating system 104 initializing the address space data structures and page tables thereof and returning the virtual address for the symbol main( ) (or, an analogous function, depending on the implementation) back to client operating system 102. In one or more embodiments, operation 506 may then involve client operating system 102 attempting to execute the program by calling the address associated with main( ).

In one or more embodiments, operation 508 may involve the page fault handler associated with client machine 152 transmitting an appropriate request for resolution of the page fault to server operating system 104. In one or more embodiments, operation 510 may then involve the appropriate page being read in and content(s) thereof being transmitted over interconnect 122 to client operating system 102. In one or more embodiments, operation 512 may involve client operating system 102 allocating a physical page to the content(s) transmitted to client machine 152. In one or more embodiments, operation 514 may then involve checking as to whether the complete transmission of the content(s) to client operating system 102 is accomplished. If yes, in one or more embodiments, operation 516 may then involve client operating system 102 updating page table 402. If no, in one or more embodiments, control may pass to operation 510.

In one or more embodiments, at the application program-level, the lifetime of a "process" may merely be spent with pages in an address space thereof. However, in one or more embodiments, whenever the "process" makes a system call, new system call stubs in client operating system proxy layer 106 may redirect the call to server operating system 104 through an appropriate message. In an example implementation, the aforementioned message may take the form:

CLIENT_SYSTEM_CALL<args>, wherein args refers to the arguments associated with the message.

In one or more embodiments, server operating system 104 may then call a standard system call entry point function with the abovementioned arguments just as if the request were initiated from an application program thereon. In one or more embodiments, in the return path, server operating system 104 may package the return value and modifications to the arguments passed by reference in an acknowledgment message back to client operating system 102. In one or more embodiments, client operating system 102 may then copy over the return value(s) to placeholder(s) associated with the application program, log the system call arguments and return value(s) locally. In one or more embodiments, client operating system 102 may then return control back to the application program.

In one or more embodiments, when a "process" exits via an exit( ) system call (or, an analogous implementation), client operating system 102 may clean up the state associated with the "process" on client machine 152 (e.g., frees up page tables associated with the process and allocated tables). In one or more embodiments, client operating system 102 may then transmit an appropriate exit message to server operating system 104. In an example implementation, the aforementioned exit message may take the form:

CLIENT_EXIT<args>,
where <args> refers to the arguments associated with the exit message.

In one or more embodiments, server operating system 104 may then similarly clean up the state associated with the "process" on server machine 154. In one or more embodiments, server operating system 104 may then transmit an acknowledgment back to client operating system 102.

In one or more embodiments, when server operating system 104 crashes and reboots, the application program executing immediately prior to the crash may need to be resumed. In one or more embodiments, although the address space associated with the application program is intact at client operating system 102, data structure(s) associated with server operating system 104 that capture the state of the operating system associated with the application program (e.g., client operating system 102) may have been lost during the course of the crash.

In one or more embodiments, to facilitate reconstruction of the server-side operating system state of the application program, system call(s), arguments and return value(s) made by the application program may be logged in at client machine 152 and replayed when server operating system 104 reboots after the crash. In one or more embodiments, when the "process" acquires the same process identifier (PID) (e.g., a number utilized by the kernel of the operating system to uniquely identify the "process"), same shared memory segment identifier, same file descriptor(s) etc., safety may be ensured. In one or more embodiments, in order to address safety, the arguments passed by reference and system call return values may be saved.

In one or more embodiments, when server machine 154 reboots after the crash, a special replay process may be initiated on server machine 154 (e.g., through client machine 152) that performs system call replay. In one or more embodiments, the replay process may involve walking through system calls from the log to enable sequential replay thereof. For the sequential replay, in one or more embodiments, server operating system 104 may be configured to call equivalent Application Programming Interface(s) (API(s)) in a dynamically loadable kernel module therein that receives as arguments the "old" values of logged arguments that were passed by reference and "old" system call return codes. In one or more embodiments, these additional arguments may provide hints to server operating system 104 for the new set of output and return values.

For example, the open system call may return the file descriptor. When calling a restart-friendly API, the kernel module may receive an additional parameter "oldfd" (read as old file descriptor (fd)) as arguments of an example function open_restart(args) (args, again, refer to arguments). Server operating system 104 may then attempt to allot the same fd value specified through oldfd, thereby enabling recreation of the kernel state associated with the application program at the server side. If a pointer in the address space associated with the application program is passed to the system call, the content(s) of memory that the pointer points to may also be logged after the system call returns. The aforementioned content(s) may then be passed to the restart-friendly API for the reconstruction of the operating system state of the application program at the server side.

The aforementioned restart information may even be written to the NVRAM on client machine 152 during a presence therein due to "persistence" in the event of a crash associated with client operating system 102. Obviously, the NVRAM content(s) may be periodically flushed to the log file on non-volatile storage (e.g., disk) as a background activity.

In one or more embodiments, the signaling mechanism discussed above with regard to I/O completion on the side of server operating system 104 may be utilized to perform an optimization process during the system call replay. For example, all write( ) calls associated with the file system that have been flushed to non-volatile storage (e.g., disk) may not be required to be replayed. Only the write( ) calls that have not received acknowledgment(s) from server machine 154 may need to be replayed. In one or more embodiments, the aforementioned optimization may significantly reduce replay time as I/O operation(s) involve higher latencies when compared to computation. In one or more embodiments, efficient log management may need to be performed to ensure that the log files do not unmanageably expand size-wise. In one or more embodiments, the aforementioned optimization may also be utilized to delete unwanted write( ) records in the log at the client machine (e.g., client machine 152).

In one or more embodiments, another optimization process associated with regard to read( ) system calls may be performed during replay. In one or more embodiments, for each open file descriptor, the replay process utilizes the last read( ) or write( ) call on the aforementioned file descriptor, as discussed above, and seeks the file offset indicated by the aforementioned call to ensure that the file offset(s) are appropriate on the restart of the application program. In one or more embodiments, further, the read( ) system call may be ignored otherwise totally from replay as the file system buffers associated with the application program may already be populated correctly from previous read calls that have returned prior to a crash. In one or more embodiments, additionally, the content(s) of the buffers associated with the application program that are passed to the read( ) system call may not be required to be logged because of not being part of the kernel-state (except for the file offset).

To summarize, in one or more embodiments, the "log" as used above may be associated with the operating system. In one or more embodiments, the "log" may be saved through the file system implementing the operating system (e.g., at client machine 152). In one or more embodiments, whenever the application program performs a system call, client operating system 102 may be configured to create log of the system call. Thus, in one or more embodiments, the log at the client side may include all system calls performed through the application program. In one or more embodiments, as only the arguments and return values are logged, the aforementioned log may be written out into a file. Therefore, in one or more embodiments, even if server machine 154 crashes and reboots, the log is still in the memory of client machine 152.

In one or more embodiments, client operating system proxy layer 106 may initiate the replay discussed above. In one or more embodiments, following the initiation of the replay, the requests may be transmitted over interconnect 122 to server machine 154. In one or more embodiments, as the log includes elements that initially constructed the server-side state of the application program, when the log is replayed, the original server-side state of the application program may be completely reconstructed sequentially.

In one or more embodiments, high availability of the one or more application programs of FIG. 1 may be ensured even in the presence of operating system failures. Also, as discussed above, in one or more embodiments, the application program may continue from a state of execution thereof at the time of a crash after the crash. This is in direct contrast to checkpointing, which restores the application program to a previous state thereof prior to the crash. As exemplary embodiments discussed above enable logging of minimal information at system call points, performance overhead(s) may be significantly reduced when compared to architectures involving checkpointing.

In one or more embodiments, client machine 152 and server machine 154 may also utilize heterogeneous hardware (instead of utilizing homogeneous hardware, which is also supported by the exemplary embodiments), in contrast to an active/active high availability cluster solution. Exemplary embodiments discussed above may also enable the use of "thin" client machine(s) 152 (e.g., Personal Digital Assistant(s) (PDAs), mobile phones) and "fat" servers, thereby allowing application program(s) to execute on low-end computing devices. In one or more embodiments, in the case of execution on a low-end computing device, a high-speed wireless network may be utilized to serve as a high-speed interconnect (e.g., interconnect 122) between client machine 152 and server machine 154. In one or more embodiments, client operating system 102 and server operating system 104 may also be different operating systems as long as client machine 152 and server machine 154 are configured to communicate through a common protocol. It is obvious that homogeneous operating systems (e.g., client operating system 102 and server operating system 104 being similar) are supported through the exemplary embodiments discussed herein.

In one or more embodiments, server machine 154 may also be utilized as a "pure" file-server or a web-server, thereby enabling the offloading of a lot of computation associated with the user-space application program(s) to client machine 152. Thus, exemplary embodiments may also provide benefit(s) associated with server load-balancing and reliability. In one or more embodiments, server machine 154 may be available to receive more load, thereby being capable of being the "main server" for other application program(s) executing on other client machine(s) 152 having a similar computational model.

In one or more embodiments, organizations/companies hosting critical application program(s) on a server cluster may utilize the concepts discussed herein to improve the reliability of the aforementioned application program(s). In one or more embodiments, large-scale simulation(s)/scientific computation(s) may benefit from the concepts discussed herein as server crashes may not compromise work. In one or more embodiments, the concept of splitting user-level and kernel-level page tables between client machine 152 and server machine 154 may also ease recovery of data thereon.

Figure 6:
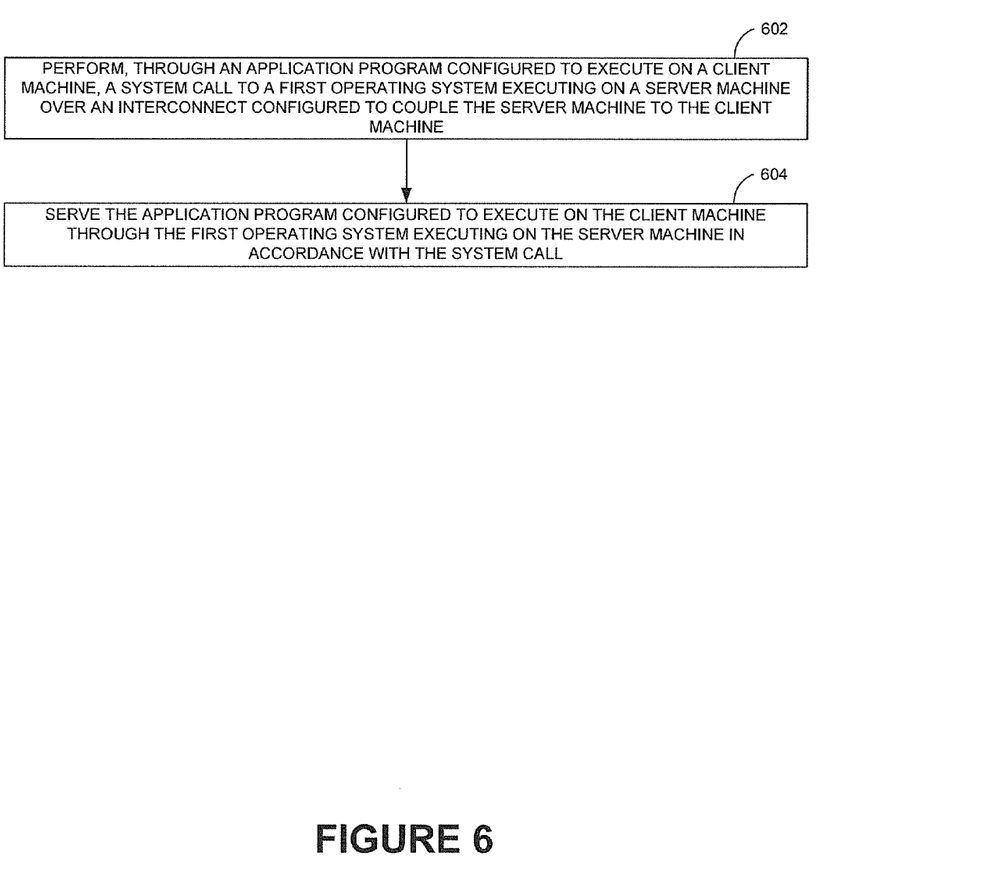
FIG. 6 is a process flow diagram detailing the operations involved in a method of application program-operating system decoupling, according to one or more embodiments.

FIG. 6 shows a process flow diagram detailing the operations involved in a method of application program (e.g., application 112)-operating system (e.g., server operating system 104) decoupling, according to one or more embodiments. In one or more embodiments, operation 602 may involve performing, through an application program (e.g., application 112) configured to execute on client machine 152, a system call to a first operating system (e.g., server operating system 104) executing on server machine 154 over an interconnect 122 configured to couple server machine 154 to client machine 152. In one or more embodiments, operation 604 may then involve serving the application program configured to execute on client machine 152 through the first operating system executing on server machine 154 in accordance with the system call.

Figure 7:
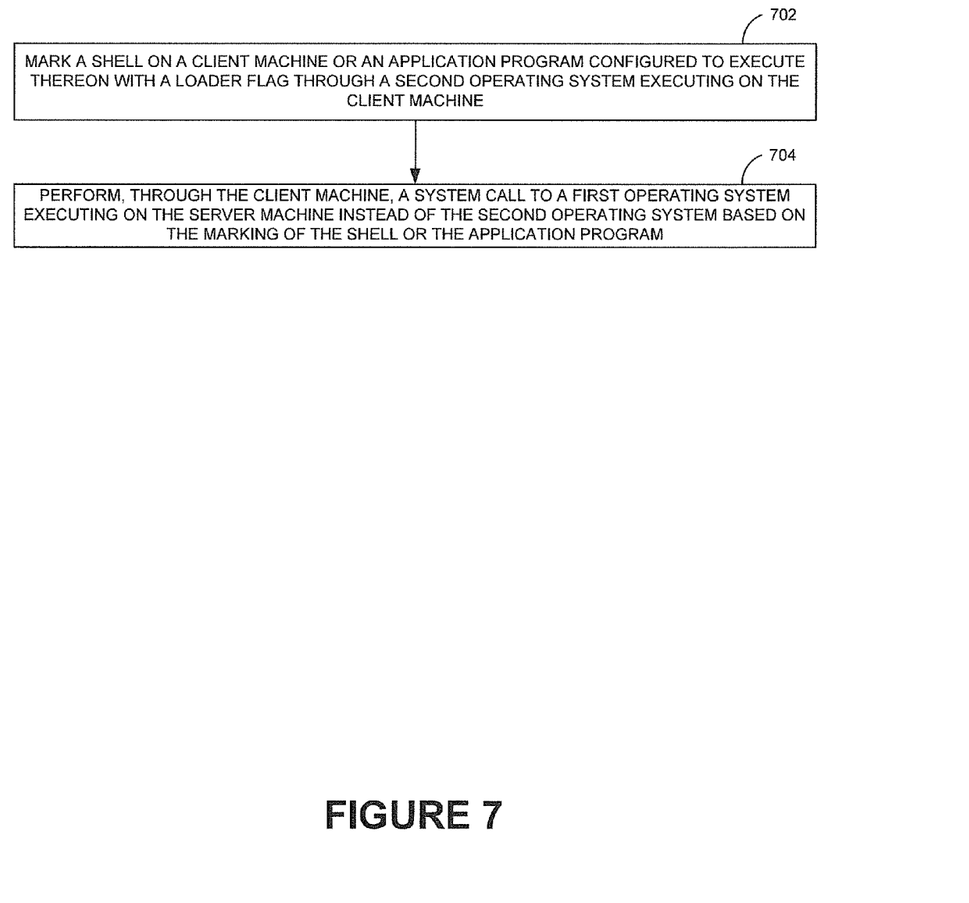
FIG. 7 is a process flow diagram detailing the operations involved in a method of requesting service from the server operating system through the application program of FIG. 1, according to one or more embodiments.

FIG. 7 shows a process flow diagram detailing the operations involved in a method of requesting service from a first operating system (e.g., server operating system 104) executing on a server machine (e.g., server machine 154) through an application program (e.g., application 112) configured to execute on a client machine (e.g., client machine 152), according to one or more embodiments. In one or more embodiments, operation 702 may involve marking a shell on the client machine or the application program configured to execute thereon with a loader flag through a second operating system (e.g., client operating system 102) executing on the client machine. In one or more embodiments, operation 704 may then involve performing, through the client machine, a system call to the first operating system executing on the server machine instead of the second operating system based on the marking of the shell or the application program.

It is obvious that the separate messages (e.g., CLIENT_FOPEN_REQ, CLIENT_READ_REQ, CLIENT_WRITE_REQ) for the open( ) read( ) and write( ) system calls mentioned above may be packaged instead, for example, as:
CLIENT_SYSTEM_CALL <CLIENT_FOPEN_REQ, args>,
CLIENT_SYSTEM_CALL <CLIENT_READ_REQ, args>, and
CLIENT_SYSTEM_CALL <CLIENT_WRITE_REQ, args>,
where args is the arguments associated with the respective messages.

In one or more embodiments, any other system calls may be similarly implemented. It is obvious that the abovementioned system calls merely serve as examples, and other implementations thereof are within the scope of the exemplary embodiments. In one or more embodiments, the execution of the set of system calls may involve execution of the stub code in client operating system proxy layer 108, packaging of arguments into a CLIENT_SYSTEM_CALL message, transmission over interconnect 122, server-side execution, return to client machine 152 and post-processing at client machine 152.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method of requesting service from a first operating system executing on a server machine through an application program configured to execute on a client machine comprising:
marking one of a shell on the client machine and the application program configured to execute thereon with a loader flag through a second operating system executing on the client machine;
performing, through the client machine, a system call to the first operating system executing on the server machine instead of the second operating system based on the marking of the one of the shell and the application program; and resuming the application program executing immediately prior to a crash of the first operating system based on reconstructing a server-side operating system state of the application program prior to the crash.

2. The method of claim 1, wherein the client machine and the server machine are one of standalone computing devices executing the second operating system and the first operating system respectively thereon and VMs executing instances of the second operating system and the first operating system respectively thereon.

3. The method of claim 1, further comprising: implementing a second operating system proxy layer at the client machine through the second operating system to route a request associated with the system call to the first operating system; implementing a first operating system communication layer at the server machine through the first operating system to interpret the request associated with the system call from the client machine; and communicating between the second operating system proxy layer and the first operating system communication layer in accordance with the request and the interpretation thereof.

4. The method of claim 1, comprising accessing data through the application program, the accessing of the data further comprising: querying the first operating system through the second operating system to obtain a descriptor associated with the data; packaging at least one argument associated with the system call into a message through the second operating system; and transmitting a request associated with accessing the data from the second operating system to the first operating system through the interconnect.

5. The method of claim 4, further comprising: indicating a successful writing of a dirty page associated with a buffer at the client machine to non-volatile storage at the server machine to the second operating system through an appropriate message; retaining the dirty page in a memory of the client machine till the appropriate message is received from the server machine; and transmitting the dirty page over the interconnect to be written to the non-volatile storage at the server machine following a crash and reboot thereof, wherein the dirty page is associated with new data that is not yet flushed to non-volatile storage.

6. The method of claim 1, further comprising splitting state information at a level of the application program and the operating system through: maintaining a page table for pages associated with the application program at the client machine; and maintaining complete address space data structures at the server machine for the application program executing on the client machine.

7. The method of claim 6, further comprising: transmitting an appropriate request from the client machine to the server machine through the interconnect during a page fault; transferring content associated with the page associated with the page fault to the client machine over the interconnect when the page is found at the server machine; and updating mapping associated with the page table maintained at the client machine upon transfer of the content to the client machine.

8. The method of claim 1, wherein reconstructing the server-side operating system state of the application program prior to the crash includes: logging in the system call, arguments and return values associated therewith made through the application program at the client machine; and replaying the log during rebooting of the first operating system following the crash, wherein the log is configured to be stored at the client machine.

9. The method of claim 8, further comprising: creating a log of the system call whenever the application program performs the system call through the second operating system; initiating the replay through the second operating system proxy layer at the client machine; and replaying the log to sequentially reconstruct the server-side state of the application program prior to the crash.

10. A non-transitory, machine readable storage medium storing executable instructions, which when executed by a machine, causes the machine to perform a method for requesting service from a first operating system executing on a server machine through an application program configured to execute on a client machine, the method comprising:

marking one of a shell on the client machine and the application program configured to execute thereon with a loader flag through a second operating system executing on the client machine;

performing, through the client machine, a system call to the first operating system executing on the server machine instead of the second operating system based on the marking of the one of the shell and the application program; and resuming the application program executing immediately prior to a crash of the first operating system based on reconstructing a server-side operating system state of the application program prior to the crash.

11. The storage medium of claim 10, wherein the client machine and the server machine are one of standalone computing devices executing the second operating system and the first operating system respectively thereon and VMs executing instances of the second operating system and the first operating system respectively thereon.

12. The storage medium of claim 10, the method further comprising: implementing a second operating system proxy layer at the client machine through the second operating system to route a request associated with the system call to the first operating system; implementing a first operating system communication layer at the server machine through the first operating system to interpret the request associated with the system call from the client machine; and communicating between the second operating system proxy layer and the first operating system communication layer in accordance with the request and the interpretation thereof.

13. The storage medium of 10, comprising accessing data through the application program, the accessing of the data further comprising: querying the first operating system through the second operating system to obtain a descriptor associated with the data; packaging at least one argument associated with the system call into a message through the second operating system; and transmitting a request associated with accessing the data from the second operating system to the first operating system through the interconnect.

14. The storage medium of 10, further comprising splitting state information at a level of the application program and the operating system through: maintaining a page table for pages associated with the application program at the client machine; and maintaining complete address space data structures at the server machine for the application program executing on the client machine.

15. The storage medium of 10, wherein reconstructing the server-side operating system state of the application program prior to the crash includes: logging in the system call, arguments and return values associated therewith made through the application program at the client machine; and replaying the log during rebooting of the first operating system following the crash, wherein the log is configured to be stored at the client machine.

16. The storage medium of 10, the method further comprising: creating a log of the system call whenever the application program performs the system call through the second operating system; initiating the replay through the second operating system proxy layer at the client machine; and replaying the log to sequentially reconstruct the server-side state of the application program prior to the crash.

17. A system, comprising:
a server machine executing a first operating system; and
a client machine executing an application configured to request service from the first operating system
wherein one of a shell on the client machine is marked and the application program is configured to execute thereon with a loader flag through a second operating system executing on the client machine;
wherein the client machine performs a system call to the first operating system executing on the server machine instead of the second operating system based on the marking of the one of the shell and the application program; and
wherein the application program execution is resumed immediately prior to a crash of the first operating system based on reconstructing a server-side operating system state of the application program prior to the crash.

18. The system of claim 17, wherein the client machine and the server machine are one of standalone computing devices executing the second operating system and the first operating system respectively thereon and VMs executing instances of the second operating system and the first operating system respectively thereon.

19. The system of claim 17, wherein the client machine implements a second operating system proxy layer at the client machine through the second operating system to route a request associated with the system call to the first operating system; and the server machine implements a first operating system communication layer through the first operating system to interpret the request associated with the system call from the client machine; and wherein the second operating system proxy layer and the first operating system communication layer communicate in accordance with the request and the interpretation thereof.

20. The system of 17, wherein reconstructing the server-side operating system state of the application program prior to the crash includes: logging in the system call, arguments and return values associated therewith made through the application program at the client machine; and replaying the log during rebooting of the first operating system following the crash, wherein the log is configured to be stored at the client machine.

21. The system of 17, wherein a log of the system call is created whenever the application program performs the system call through the second operating system; the replay through the second operating system proxy layer at the client machine is initiated; and the log is replayed to sequentially reconstruct the server-side state of the application program prior to the crash.

\* \* \* \* \*